Figure 1:
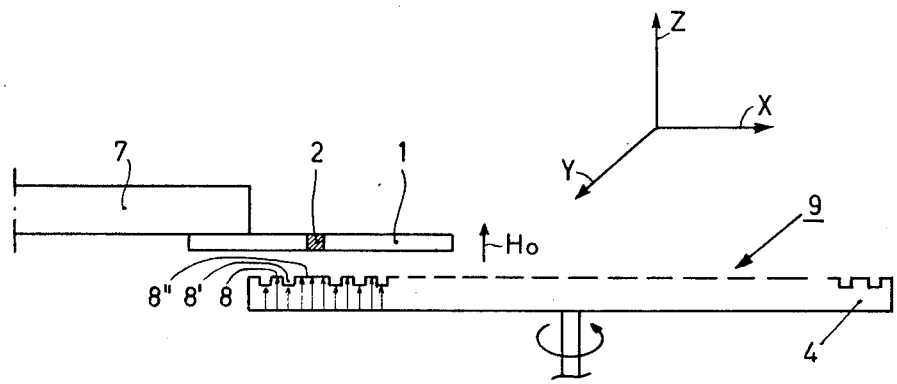

United States Patent [19]
de Jonge

[11] 4,012,777
[45] Mar. 15, 1977

[54] RECORD CARRIER AND DEVICE FOR PLAYING BACK SAME

[75] Inventor: Frederik Ate de Jonge, Eindhoven, Netherlands

[73] Assignee: U.S. Philips Corporation, New York, N.Y.

[22] Filed: Dec. 15, 1975

[21] Appl. No.: 640,485

Related U.S. Application Data

[63] Continuation of Ser. No. 547,993, Feb. 7, 1975, abandoned.

[30] Foreign Application Priority Data

Feb. 28, 1974 Netherlands ............. 7402690

[52] U.S. Cl. ............. 360/77; 360/55; 360/110

[51] Int. Cl.² ............. G11B 5/02; G11B 21/02; G11B 5/12

[58] Field of Search ............. 360/77, 110, 113, 55, 360/111, 75; 340/174 TF, 174 M, 174 FB

[56] References Cited

UNITED STATES PATENTS 3,793,639  2/1974  Enz et al. ............. 360/110

*Primary Examiner*—Alfred H. Eddleman
*Attorney, Agent, or Firm*—Frank R. Trifari; Simon L. Cohen

[57] ABSTRACT

A recording device for storing and playing back information in which mechanical deformations which are representative of the stored information are provided in the surface of a record carrier consisting of a permanent magnetizable material or being covered with such a material. As a playback element is present a sheet of monoaxial magnetizable material which comprises a single-walled magnetic domain ("bubble"). The size of the domain is modulated upon moving the recording medium with respect to the sheet. Deposition of the domain in the sheet upon playing back can be corrected by way of fine control.

8 Claims, 2 Drawing Figures

U.S. Patent

Mar. 15, 1977

4,012,777

RECORD CARRIER AND DEVICE FOR PLAYING BACK SAME

This is a continuation, of application Ser. No. 547,993, filed Feb. 7, 1975, now abandoned.

The invention relates to a recording device comprising a magnetic converter element cooperating with a magnetizable record carrier.

Recording devices of this type are, for example, magnetic disc files in which magnetic discs are used with which magnetic converter elements (magnetic heads) cooperate for recording and playing back information.

In order to be able to play back a magnetic disc having a very high information density, a converter element is necessary which is suitable not only to play back very narrow information tracks but in addition to play back tracks which are situated very close beside each other. This latter involves that the converter element during playing back must be kept centered on the center of the playback track by means of a servo system, which presents numerous problems when using conventional magnetic heads.

It is the object of the invention to provide a simple solution to this problem. For that purpose, the recording device according to the invention is characterized in that the converter element is formed by a sheet of magnetizable material having an easy axis of magnetization normal to the plane of the sheet, which sheet comprises a single-walled magnetic domain, a detector for detecting variations in the size of the domain caused by variations in the field pattern of the record carrier being provided on the sheet, as well as means to correct the position of the domain in the sheet.

A single-walled magnetic domain which is present in a domain sheet which is moved relatively with respect to a magnetized record carrier will be influenced by the magnetic field on the surface of the carrier: the size or position of a single-walled magnetic domain depends on the field which the domain feels and will therefore be modulated by the field pattern of the record carrier.

Because magnetic domains can be very small (for example may have a cross-section of 1 micron) it is possible to play back record carriers with a very large information density. The particular aspect of the recording device according to the invention resides in the possibility that, due to the fact that the movement of the domain in the domain sheet can be controlled, a simple but very precise fine control of the position of the play back element relative to the track to be displayed can be obtained. The movement of the domain may enclose an angle with the direction of relative movement of the record carrier so as to center the domain on the track, but it is also possible, however, to move the domain in the direction of relative movement of the record carrier so as to correct speed variations.

The detector preferably consists of two parallel detection elements of magneto-resistance material which are provided on the sheet on either side of a groove which encloses an angle with the direction of relative movement of the sheet with respect to the carrier and the magnetic domain can be moved along the groove, and the magnetic domain can be moved in the sheet of magnetizable material as a function of a difference signal which is derived from the comparison of the signals of the two detection elements.

A drawback of the use of magnetizable record carriers in recording devices is that it is difficult to transfer the information which they contain directly (by means of contact copying) onto another record carrier.

However, record carriers are also known in the form of discs in which the information (for example a video program) is present in the form of blocks and pits, respectively, of variable length in a spiral-like track or a track consisting of concentric circles (so-called "video longplay disc": Dutch Patent Application 7102863). It is comparatively simple to provide said information by means of photolithographic methods, while due to its relief shape such a carrier is suitable to serve as a matrix of which copies can be made by means of a moulding process. Playing back the information on such a carrier, which has to take place optically, however, presents certain problems. For example, for the required accurate focusing a rather complicated optical system is necessary and when the information track is spiral-like, an extremely high accuracy is necessary to obtain the correct pitch in following said track (see, for example, Dutch Patent Application 7103234).

The present invention also provides a recording device having a record carrier which can both be played back with simple means and can be copied in a simple manner.

For that purpose the recording device according to the invention comprises a record carrier in the surface of which mechanical deformations are provided which are representative of the stored information, the carrier consisting of or being covered with a layer of magnetizable material which is magnetized permanently in a direction normal to the surface.

Due to the presence of level differences (blocks and pits, respectively) in the surface of the carrier, a magnetic field pattern is present on the surface of the record carrier magnetized in the above described manner, which pattern corresponds to the stored information (Said information may be recorded, for example, in an analogous, binary or holographic code). The magnetic field which the converter element feels when it is moved over the carrier will now vary in accordance with level differences present in the surface. The advantage is that (magnetic copies can be made of said record carrier in a simple manner, for example, by making copies in magnetizable material by means of a moulding process of a master plate and causing a magnetic field to influence the resulting copies during moulding. Another possibility is to make copies in a non-magnetizable material, to provide them with a coating of a magnetizable material and finally to magnetize said coating. The copies thus made can be played back by means of the above-described converter element with which the information track can be followed very exactly. (An extra advantage is that the information provided optically can still be played back optically.)

The present application is similar to my copending applications Ser. No. 464,786, filed Apr. 29, 1974, and now U.S. Pat. No. 3,935,594. The subject matter of this U.S. patent differs from the present invention in that the disc in the present application has a permanent magnet layer on the recording surface that has surface deformations containing the information, whereas the recording disc of the patent has a flat magnetizable surface, so that the disc of the patent may be selectively recorded using the magnetic bubble in cooperation with an additional magnetic field.

Figure 2:
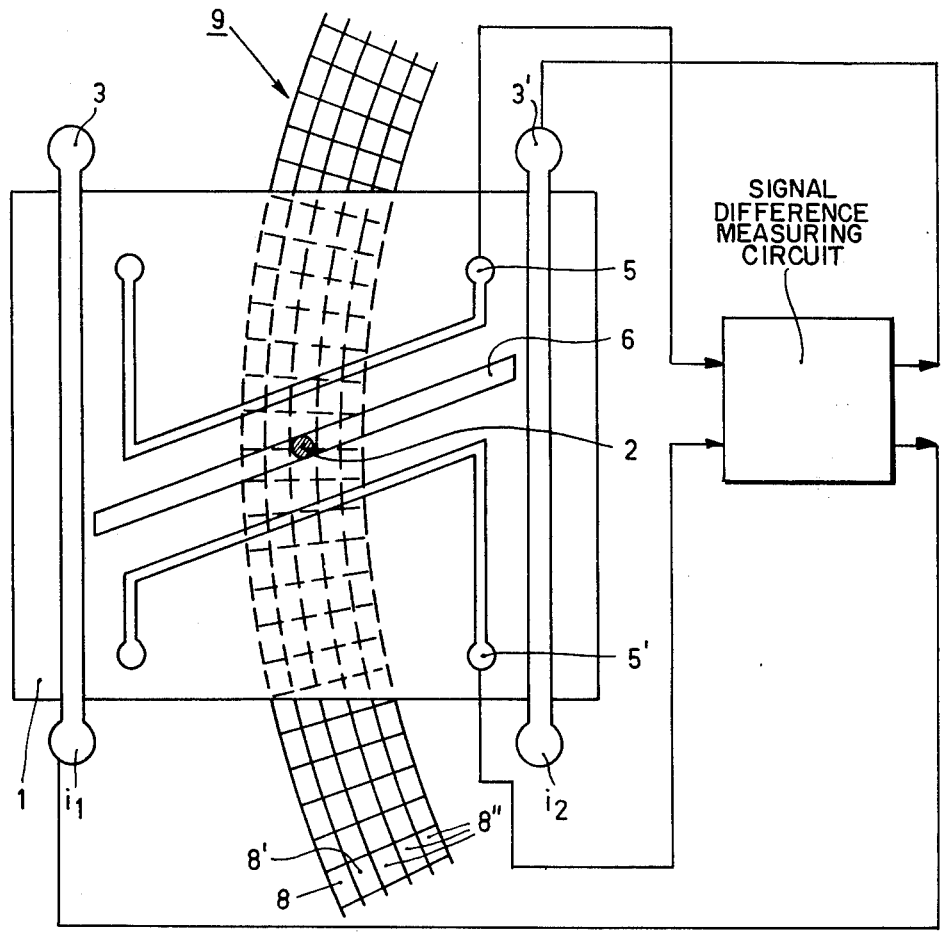

The invention will be described in greater detail, by way of example, with reference to the drawing. In the drawing, FIG. 1 shows a recording device having a record carrier and a converter element, and FIG. 2 is a plan view of the converter element shown in FIG. 1.

A plate of magnetizable material 1 in which a single-walled magnetic domain 2 (so-called "bubble") has been generated (FIG. 1) is contacted with or provided at a short distance from a disc 4 having a record-carrying magnetic field pattern in such manner that the X-direction shown is directed towards the center of the disc 4. A bias field $H_o$ (in the +Z direction) is normal to the plate 1 and has a sufficient field strength to maintain the bubble 2 which can be generated in the plate 1 in known manner. The disc 4 has a spiral-like information track 9 which may also be built up from concentric circles. This may have been made, for example, by providing on a disc of magnetizable material a photolacquer which, by rotation of the disc relative to a punctiform light source, in particular a laser, is intermittently exposed and not exposed for variable periods corresponding to the information. After development of the photolacquer and using a photoetching process a track is then obtained which consists of mechanical deformations. By subsequently magnetizing uniformly in a direction normal to the surface, the situation shown in FIG. 1 is obtained that in the disc a comparatively strong field is present in certain places (8, 8'') and a comparatively weak field is present in the other places (8'). These fields, together with the bias field $H_o$, determine the size of the bubble 2 in a given plane above the disc surface. The size of the bubble 2 is thus modulated upon rotation of the disc 4. The sum of the signals of the magnetoresistance detectors 5 and 5' present on either side of the bubble 2 at equally large distances is indicative of the bubble size and hence of the information instantaneously present in the track 9 below the bubble 2. When the bubble 2 readily follows the track 3, the signal of the detector 5 is equal to that of the detector 5'. When the bubble 2 deviates from such a track, there arises a difference between the signals of the detectors 5 and 5'. This difference is detected by the signal difference measuring current shown in FIG. 2.

The reason for the difference in current in the detectors in response to a shift in the tracks relative to the center of the bubble 2 results from the geometry of the tracks, the bubble and the detectors. If the track is centered properly the interaction between the bubble and the track will be uniform with respect to the detectors. If, on the other hand, the track shifts to the left of the bubble in FIG. 2 so that the interaction only takes place in an area on the extreme left side of the bubble 2, the area of interaction will be closer to detector 5 than to detector 5'. This can be verified by imagining a vertical line and a horizontal line each passing through the center of the bubble 2, and dividing the bubble into four quadrants. In addition, an imaginary line must be drawn longitudinally in the center of scratch 6. It will then be seen that the lower right hand quadrant is entirely on the side of the scratch center line that lines close to detector 5', while the upper left hand quadrant is totally on the side of the scratch which lies above the scratch center line and therefore closer to detector 5. The two remaining quadrants are equally divided by the scratch center line. If the interaction between the track and the bubble takes place only on the left side of the bubble (that is, the track has moved half the distance of the bubble) the interaction between the track and the bubble detected by the detector 5 will include signals from the upper left hand quadrant of the bubble and half of the lower left hand quadrant, while the detector 5' will detect only signals from the lower left hand quadrant. Thus radial shifts of the tracks with respect to the bubble may easily be detected. The bubble plate 1 is constructed so that the bubble 2 is adhered to a scratch 6 in the plate surface. The place in which the bubble 2 is adhered to the scratch 6 is determined by the ratio of the currents $i_1$ and $i_2$ provided by the signal difference measuring circuit through the current conductors 3 and 3'. The bubble 2 will takes its position there where a minimum field is present between the current conductors 3 and 3'. The extent to which bubble 2 is adhered to a specific plate in the scratch 6 is determined by the absolute values of the currents $i_1$ and $i_2$. These are adjusted so that the bubble position can easily be readjusted. This occurs by varying the ratio of the currents $i_1$ and $i_2$ until the difference signal of the detectors 5 and 5' is again zero. In this manner an exact following of the track to be detected is obtained. For that purpose the groove 6 has such a length that it covers a few tracks. A coarse following of the track is effectuated by controlling the movement of the arm 7 to which the plate 1 is attached.

What is claimed is:

1. A recording device comprising a magnetic converter element cooperating with magnetic tracks on a magnetizable record carrier, wherein the converter element comprises a sheet of magnetizable material having an easy axis of magnetization normal to the plane of the sheet, which sheet comprises a single-walled magnetic domain, means on said sheet for detecting variations of the size of the magnetic domain caused by variations in the field pattern of the record carrier, means on said sheet for detecting a shift of said magnetic domain with respect to said tracks, and means for correcting the position of the domain in the sheet with respect to said tracks.

2. A device as claimed in claim 1, further comprising means on said sheet for confining said domain to movement along a straight line which encloses an angle with the direction of relative movement of the record carrier with respect to the sheet so as to keep it centered on the track during playback.

3. A device as claimed in claim 1, wherein the domain in the sheet is movable along a straight line which coincides with the direction of relative movement of the record carrier with respect to the sheet, and means responsive to velocity changes in said direction for moving said domain along said direction so as to correct velocity variations during playback.

4. A device as claimed in claim 2, wherein the domain is movable along a groove in the surface of the sheet, and where said position correction means comprises two current conductors each extending at one end of the groove parallel to each other and at an angle with the axis of the groove and means for passing currents through said conductor.

5. A device as claimed in claim 4, wherein said means for detecting a shift in said magnetic domain is located along the long sides of the groove and at equal distances therefrom, and comprises two mutually parallel detection elements on the sheet which together constitute the detector.

6. A device as claimed in claim 5, wherein the detection elements are manufactured from magneto-resistance material.

7. A device as claimed in claim 5, wherein said means for passing said currents is responsive to the signals of the two detection elements.

8. A device as claimed in claim 1, wherein a record carrier in which mechanical deformations which are representative of the stored information are provided in the surface, the information carrier being covered with a layer of a magnetizable material which is permanently magnetized in a direction normal to the surface.

* * * * *

UNITED STATES PATENT AND TRADEMARK OFFICE
CERTIFICATE OF CORRECTION

PATENT NO. : 4,012,777
DATED : March 15, 1977
INVENTOR(S) : FREDERIK ATE DE JONGE It is certified that error appears in the above-identified patent and that said Letters Patent are hereby corrected as shown below:

ON THE TITLE PAGE

Section [30] should read as follows:

-- [30]  Foreign Application Priority Data

Feb. 28, 1974　Netherlands..............7402690
　　Feb. 28, 1974　Netherlands..............7402694

Signed and Sealed this

Twenty-fourth Day of May 1977

[SEAL]

Attest:

RUTH C. MASON
*Attesting Officer*

C. MARSHALL DANN
*Commissioner of Patents and Trademarks*